US010962418B1

(12) United States Patent
Chen (10) Patent No.: US 10,962,418 B1
(45) Date of Patent: Mar. 30, 2021

(54) MEASURING DEVICE (71) Applicant: Industrial Technology Research Institute, Hsinchu (TW)

(72) Inventor: Chien-Wen Chen, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 16/726,256

(22) Filed: Dec. 24, 2019

(30) Foreign Application Priority Data

Dec. 19, 2019 (TW) .................................. 108146783

(51) Int. Cl.
*G01B 9/02* (2006.01)
*G01J 9/02* (2006.01)
(Continued)

(52) U.S. Cl.
CPC .............. *G01J 9/02* (2013.01); *G02B 27/144* (2013.01); *G02B 27/4233* (2013.01)

(58) Field of Classification Search
CPC .. G01J 9/02; G01J 2009/0261; G02B 27/144; G02B 27/4233; G01B 9/02019;
(Continued)

(56) References Cited

U.S. PATENT DOCUMENTS 4,979,826 A * 12/1990 Ishizuka .................. G01D 5/38
250/231.16

5,038,032 A * 8/1991 Nishimura ............... G01D 5/38
250/231.16
(Continued)

FOREIGN PATENT DOCUMENTS

CN 107664481 2/2018
TW 345614 11/1998
(Continued)

OTHER PUBLICATIONS

Fang Cheng, et al., "Linear diffraction grating interferometer with high alignment tolerance and high accuracy." Applied Optics, vol. 50, No. 22, Aug. 1, 2011, pp. 4550-4556.
(Continued)

*Primary Examiner* — Tarifur R Chowdhury
*Assistant Examiner* — Jonathon Cook
(74) *Attorney, Agent, or Firm* — JCIPRNET (57) ABSTRACT A measuring device including a light source emitting a light beam, a first beam splitter disposed on a light path of the light beam, an optical grating, a reflector, and a sensor is provided. The light beam is divided into first and second light beams by the first beam splitter. The optical grating is disposed on light paths of the first and second light beams. The first beam splitter enables the first light beam to be delivered to the optical grating. The reflector is disposed on the light path of the second light beam. The first beam splitter enables the second light beam to be delivered to the reflector and reflected to the optical grating. The first and second light beams are diffracted by the optical grating to generate multiple first and second diffraction light beams at different angles respectively, which are received by the sensor after interference.

14 Claims, 11 Drawing Sheets (51) Int. Cl.
*G02B 27/14* (2006.01)
*G02B 27/42* (2006.01)

(58) Field of Classification Search
CPC ...... G01B 2290/70; G01D 5/266; G01D 5/38; G01D 5/344; G01D 5/345; G01D 5/34746
See application file for complete search history.

(56) References Cited

U.S. PATENT DOCUMENTS

| | | | | |
|---|---|---|---|---|
| 5,146,085 | A * | 9/1992 | Ishizuka | G01D 5/38 |
| | | | | 250/231.16 |
| 5,448,357 | A * | 9/1995 | Muraki | G01D 5/38 |
| | | | | 356/488 |
| 5,486,919 | A * | 1/1996 | Tsuji | G01N 21/88 |
| | | | | 356/237.4 |
| 5,717,488 | A * | 2/1998 | Watanabe | G01D 5/38 |
| | | | | 250/237 G |
| 5,818,588 | A * | 10/1998 | Matsumoto | G01D 5/266 |
| | | | | 356/487 |
| 6,919,561 | B2 | 7/2005 | Lee et al. | |
| 7,259,863 | B2 | 8/2007 | Ishizuka | |
| 7,391,500 | B2 | 6/2008 | Nakata | |
| 7,573,581 | B2 | 8/2009 | Holzapfel | |
| 8,922,783 | B2 | 12/2014 | Bodkin | |
| 9,025,161 | B2 | 5/2015 | de Groot et al. | |
| 9,140,537 | B2 | 9/2015 | de Groot et al. | |
| 10,066,974 | B2 | 9/2018 | Liesener | |
| 10,120,196 | B2 | 11/2018 | Jeng et al. | |
| 2003/0141441 | A1 * | 7/2003 | Kawano | G01D 5/38 |
| | | | | 250/231.13 |
| 2016/0003605 | A1 * | 1/2016 | Nakamura | G01B 9/02019 |
| | | | | 356/498 |

FOREIGN PATENT DOCUMENTS

| TW | I270663 | 1/2007 |
|---|---|---|
| TW | 201221905 | 6/2012 |
| TW | 201627636 | 8/2016 |

OTHER PUBLICATIONS

"Office Action of Taiwan Counterpart Application", dated Jul. 20, 2020, p. 1-p. 3.

* cited by examiner

MEASURING DEVICE

CROSS-REFERENCE TO RELATED APPLICATION

This application claims the priority benefit of Taiwan application serial no. 108146783, filed on Dec. 19, 2019. The entirety of the above-mentioned patent application is hereby incorporated by reference herein and made a part of this specification.

TECHNICAL FIELD

The technical field relates to a device, and in particular, to a measuring device.

BACKGROUND

An optical grating sensing technology was proposed in the past, mainly aiming at performing direct spatial phase sensing on a space optical field generated by the optical grating through a moire fringe or Talbot effect. A light beam passes through a 20-μm optical grating scale and is self-imaged onto a sensor through the Talbot effect. An architecture of sensing without a secondary grating may be applied directly, and a test of prototype chip is manufactured currently. The chip is fabricated by a CMOS process. A light sensor and a related pre-stage circuit are integrated based on an optical sampling design, so that a broadband response and a suppress capability of disturbance can be improved dramatically.

However, another different principle uses a phase interference on a time domain generated by ±1 orders of an optical grating, of which the principle is based on the Doppler Effect. The sensing principle of this technology in the past is using polarization to control a path of light, and generating an orthogonal interference signal set. However, an optical structure of the technology is complicated. Furthermore, a Gauss light beam may be split into two parts by using a group of optical lenses to generate splitting light in different paths and generate ±1 order reflection after the light arrives at the optical grating. The ±1 order light is optically controlled to generate a spatial interference at designed angles and generate a spatial interference pattern, and then phase positions corresponding to 0 degree and 90 degrees are sensed by the sensor. However, the use of light splitting on the Gauss light beam results in an asymmetric light intensity of interference light and a severe drifting change of a direct current (DC). Furthermore, in the structure, a 0 order is apt to be mixed with ±1 orders, resulting in distortion of a signal.

SUMMARY

A measuring device of an embodiment of the disclosure includes a light source, a first beam splitter, an optical grating, a reflector and a sensor. The light source is configured to emit a light beam. The first beam splitter is disposed on a light path of the light beam, where the light beam is divided into a first light beam and a second light beam by the first beam splitter. The optical grating is disposed on light paths of the first light beam and the second light beam, where the first beam splitter enables the first light beam to be delivered to the optical grating. The reflector is disposed on the light path of the second light beam, where the first beam splitter enables the second light beam to be delivered to the reflector, and then the second light beam is reflected to the optical grating by the reflector. The first light beam and the second light beam are diffracted by the optical grating to generate multiple first diffraction light beams at different angles and multiple second diffraction light beams at different angles respectively. The first diffraction light beams and the second diffraction light beams are received by the sensor after interference. Included angles between the first diffraction light beams and the second diffraction light beams received by the sensor after interference are greater than 0 degree and less than 180 degrees.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
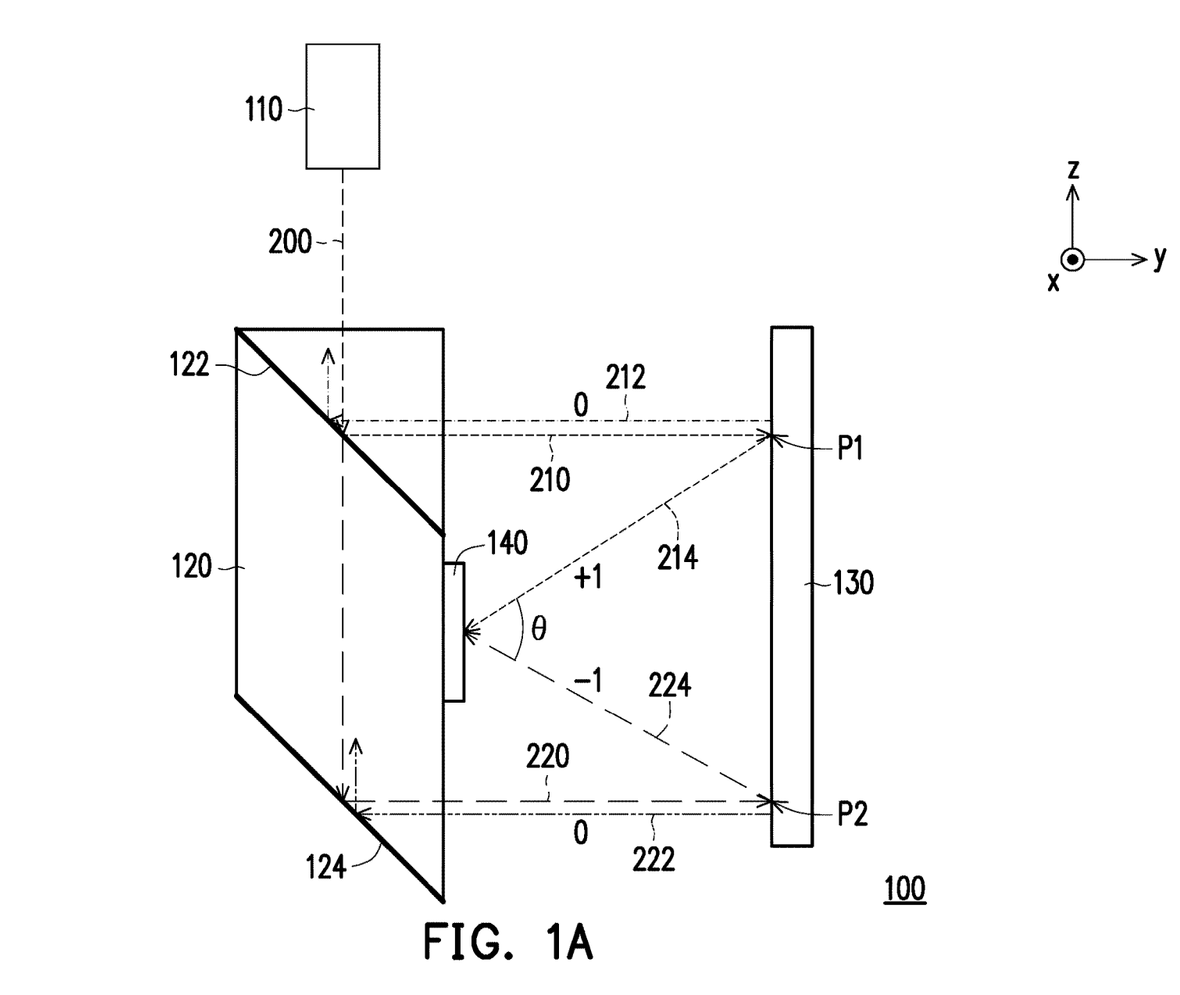
FIG. 1A is a schematic diagram of a measuring device according to an embodiment of the disclosure.

FIG. 1A is a schematic diagram of a measuring device according to an embodiment of the disclosure. Referring to FIG. 1A, a measuring device 100 of an embodiment of the disclosure includes a light source 110, a first beam splitter 122, an optical grating 130, a reflector 124, and a sensor 140. The light source 110 is configured to emit a light beam 200. For example, the light source 110 is a laser light source. For example, the light beam 200 is a linear polarized light beam including p polarized light and s polarized light. Furthermore, in this embodiment, the optical grating 130 may be a reflective optical grating, the reflector 124 may be a mirror, and the sensor 140 may be a diode light sensor on silicon. However, the disclosure is not limited thereof. For other features and characteristics of the sensor 140 of this embodiment of the disclosure, reference may be made to the light sensor in Taiwan Patent No. 1659194 or the light sensor in U.S. patent Ser. No. 10/243,668B2. The descriptions thereof are omitted herein.

In this embodiment, the first beam splitter 122 is disposed on a light path of the light beam 200. The light beam 200 is divided into a first light beam 210 and a second light beam 220 by the first beam splitter 122. To enable an interference signal received by the sensor 140 to conform to a result of a theoretical calculation and for convenience of the theoretical calculation, in this embodiment, the first beam splitter 122 is exemplarily a beam splitter with 50 percent transmittance and 50 percent reflection. However, the disclosure is not limited thereof.

Furthermore, in this embodiment, the optical grating 130 is disposed on light paths of the first light beam 210 and the second light beam 220. The first beam splitter 122 enables the first light beam 210 to be delivered to the optical grating 130. The reflector 124 is disposed on the light path of the second light beam 220. The first beam splitter 122 enables the second light beam 220 to be delivered to the reflector 124, and then the second light beam 220 is reflected to the optical grating 130 by the reflector 124. The first light beam 210 and the second light beam 220 are diffracted by the optical grating 130 to generate multiple first diffraction light beams 212 and 214 at different angles and multiple second diffraction light beams 222 and 224 at different angles respectively. A diffraction light beam of which the angle is the same as that of an incident light beam after the diffraction light beam is diffracted is defined as a zero order diffraction light beam. Both the light beam 210 and the light beam 220 are perpendicularly incident onto the optical grating 130, and thus the diffraction light beams 212 and 222 are zero order diffraction light beams 212 and 222 respectively after being diffracted by the optical grating 130. Furthermore, diffraction light beams of other orders are defined as: if diffraction light beams and incident light beams are at a same side of normal lines of the optical grating 130, the diffraction light beams are positive integer order diffraction light beams (for example, in FIG. 6 below), and if the diffraction light beams and the incident light beams are at opposite sides of the normal lines of the optical grating 130, the diffraction light beams are negative integer order diffraction light beams (for example, in FIGS. 3, 4A, 4B, 5 and 7 below). However, when the incident light beams are perpendicularly incident onto the optical grating 130, in a direction of the incident light beams, the diffraction light beams are defined to be positive integer order diffraction light beams with respect to a right hand side of the normal lines of the optical grating 130, and are defined to be negative integer order diffraction light beams with respect to a left hand side of the normal lines of the optical grating 130, for example, in FIGS. 1A, 1B and 2. Therefore, in FIG. 1A, the light beam 214 is a positive integer order diffraction light beam 214, and the light beam 224 is a negative integer order diffraction light beam 224.

Incidentally, for ease of description, in FIG. 1A, the light beam 212 is not overlapped with the light beam 210, and the light beam 222 is not overlapped with the light beam 220. However, on an optical light path, the light beam 212 should be overlapped with the light beam 210, and the light beam 222 should be overlapped with the light beam 220. Furthermore, in FIG. 1A, a direction of the z axis is defined as an arrangement direction of the reflector 124 to the first beam splitter 122, a direction of the y axis is defined as an arrangement direction of the first beam splitter 122 and the reflector 124 to the optical grating 130, and the x, y, and z axes are mutually perpendicular to each other.

Subsequently, in this embodiment, the first diffraction light beam 212, 214 and the second diffraction light beam 222, 224 generate the interference and are then received by the sensor 140. By an example in which the diffraction light beam 214 and the diffraction light beam 224 generate the interference and are then received by the sensor 140 in FIG. 1A, the diffraction light beams 214 and 224 are a +1 order diffraction light beam and a −1 order diffraction light beam respectively, an included angle between the diffraction light beam 214 and the diffraction light beam 224 is 0, and the included angle θ is greater than 0 degree and less than 180 degrees. That is, the diffraction light beams 214 and 224 are not parallel to each other. However, the disclosure is not limited thereof, and a position of the sensor 140 or a value of the included angle θ may also be adjusted appropriately, so that the diffraction light beams 214 and 224 received by the sensor 140 after interference are diffraction light beams of other orders respectively. For example, the diffraction light beams 214 and 224 are +1 order, −1 order, +2 order, or −2 order diffraction light beams.

In this embodiment, the first light beam 210 and the second light beam 220 are incident onto different positions P1 and P2 of the optical grating 130 respectively. Furthermore, the first beam splitter 122 and the first reflector 124 may be a lateral displacement beam splitter.

Figure 1B:
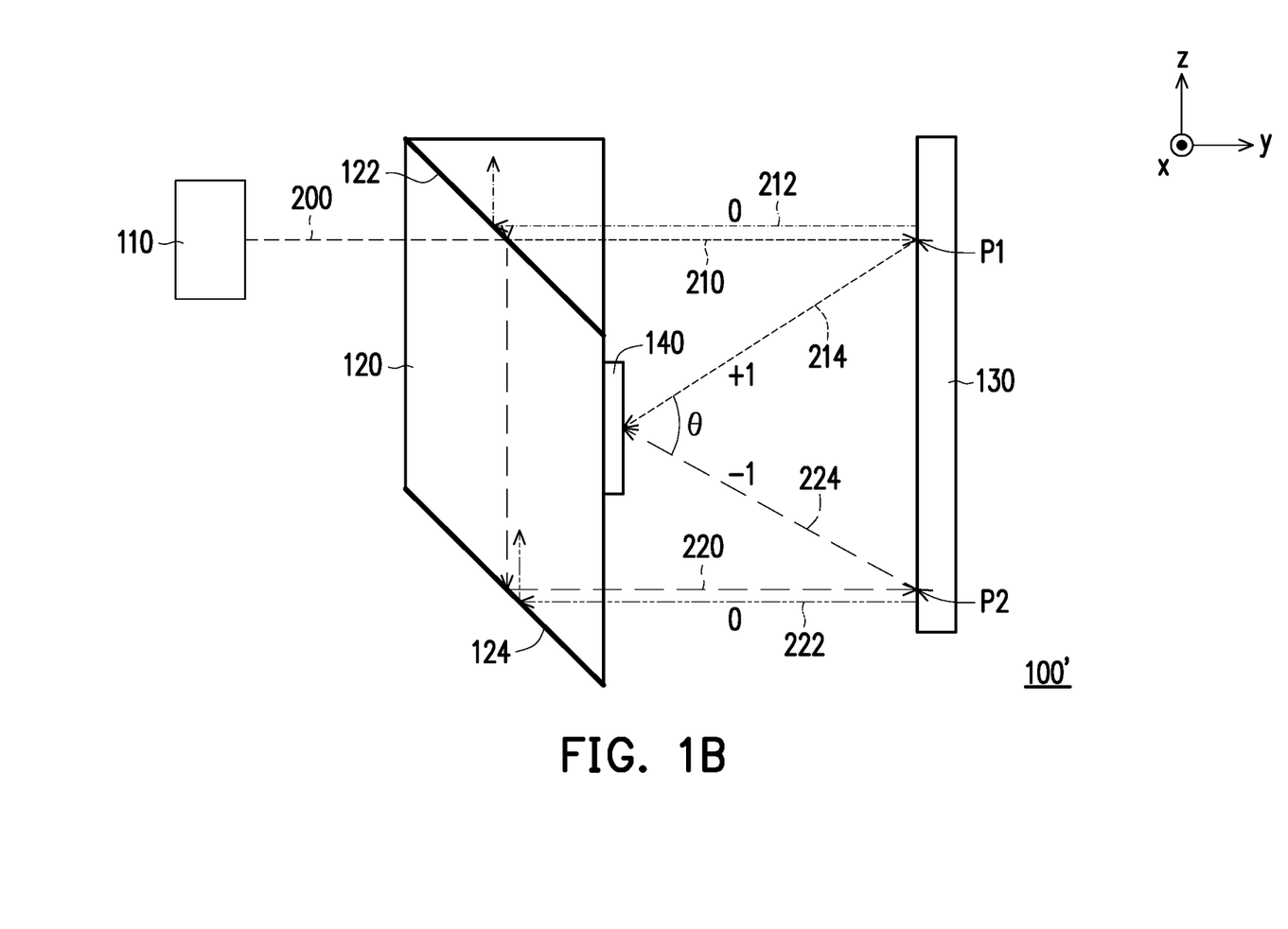
FIG. 1B is a schematic diagram of a measuring device according to another embodiment of the disclosure.

FIG. 1B is a schematic diagram of a measuring device according to another embodiment of the disclosure. Referring to FIGS. 1A and 1B, a measuring device 100' is similar to the measuring device 100 of FIG. 1A, and thus the descriptions of the same parts are omitted herein. Main differences between the measuring device 100' and the measuring device 100 are as below. In FIG. 1A, the first light beam 210 is reflected by the first beam splitter 122 to be delivered to the optical grating 130, and the second light beam 220 passes through the first beam splitter 122 to be delivered to the reflector 124. On the contrary, in FIG. 1B, a first light beam 210 passes through a first beam splitter 122 to be delivered to an optical grating 130, and a second light beam 220 is reflected by the first beam splitter 122 to be delivered to a reflector 124.

Besides, in the measuring device 100 of FIG. 1A, when a heading direction of the light beam 200 in a space is not parallel to the optical grating 130, an angle of a beam splitting surface of the first beam splitter 122 and an angle of a reflective surface of the reflector 124 may still be easily adjusted to enable the first light beam 210 and the second light beam 220 of the measuring device 100 to be perpendicularly incident onto the optical grating 130, and thus the diffraction light beams 214 and 224 may be overlapped at a needed position. On the contrary, in the measuring device 100' of FIG. 1B, when a heading direction of the light beam 200 in a space is not perpendicular to the optical grating 130, even if an angle of the beam splitting surface of the first beam splitter 122 is adjusted, an angle at which the first light beam 210 is incident onto the optical grating 130 is still not changed, so that the first light beam 210 is not perpendicularly incident onto the optical grating 130. Therefore, to enable the diffraction light beams 214 and 224 of the measuring device 100' to be overlapped at the needed position, the heading direction of the light beam 200 in the space still needs to be further considered to adjust the angle of the reflective surface of the reflector 124, so that the diffraction light beams 214 and 224 are overlapped at the needed position. That is, the measuring device 100' of FIG. 1B is relatively complicated in the adjustment compared with the measuring device 100 of FIG. 1A. Therefore, the measuring device 100 of FIG. 1A is still an exemplary manner in an application.

Figure 2:
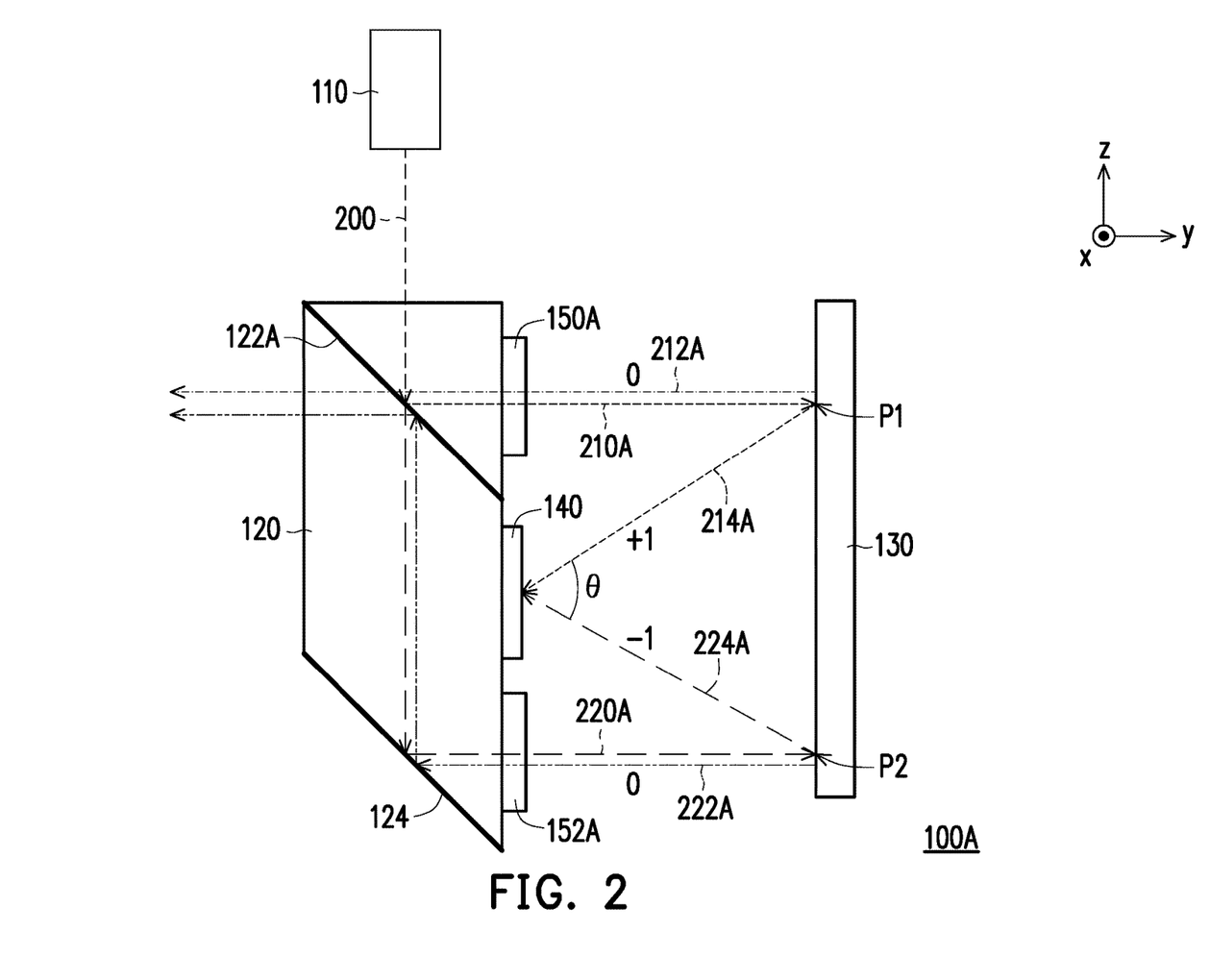
FIG. 2 is a schematic diagram of a measuring device according to another embodiment of the disclosure.

FIG. 2 is a schematic diagram of a measuring device according to another embodiment of the disclosure. Referring to FIG. 2, a measuring device 100A of FIG. 2 is similar to the measuring device 100 of FIG. 1A, and thus the descriptions of the same parts are omitted herein. Main differences between the measuring device 100A and the measuring device 100 are as below. The measuring device 100A of FIG. 2 further includes a first quarter-wave plate 150A and a second quarter-wave plate 152A. The first quarter-wave plate 150A is disposed on a light path of a first light beam 210A, and the first quarter-wave plate 150A is located between a first beam splitter 122A and an optical grating 130. The second quarter-wave plate 152A is disposed on a light path of a second light beam 220A, and the second quarter-wave plate 152A is located between a first reflector 124 and the optical grating 130.

In this embodiment, the first beam splitter 122A may be a polarized beam splitter. For example, the first beam splitter 122A may reflect s polarized light, and p polarized light may pass through the first beam splitter 122A. However, the disclosure is not limited thereof. The first beam splitter 122A may reflect the p polarized light, and the s polarized light may pass through the first beam splitter 122A. By an example in which the first beam splitter 122A may reflect the s polarized light, the first light beam 210A having s polarization is reflected by the first beam splitter 122A, then passes through the first quarter-wave plate 150A, and is transformed into a light beam 210A having circular polarization. Subsequently, the light beam 210A having the circular polarization is diffracted by the optical grating 130 to generate circular polarized diffraction light beams 212A and 214A. A zero order diffraction light beam 212A having the circular polarization passes through the first quarter-wave plate 150A and is transformed into a diffraction light beam 212A having p polarization at the same time. Therefore, the diffraction light beam 212A having the p polarization passes through the first beam splitter 122A and is not reflected to a light source 110.

Similarly, in this embodiment, the second light beam 220A having p polarization passes through the first beam splitter 122A, and is then reflected to the second quarter-wave plate 152A by the reflector 124. Subsequently, the second light beam 220A having the p polarization passes through the second quarter-wave plate 152A and is transformed into the light beam 220A having circular polarization at the same time. Subsequently, the light beam 220A having the circular polarization is diffracted by the optical grating 130 to generate circular polarized diffraction light beams 222A and 224A at different angles. A zero order diffraction light beam 222A having the circular polarization passes through the second quarter-wave plate 152A and is then transformed into the diffraction light beam 222A having s polarization. Therefore, the diffraction light beam 222A having the s polarization is reflected to the first beam splitter 122A by the reflector 124, and then the diffraction light beam 222A having the s polarization is reflected by the first beam splitter 122A, and does not pass through the first beam splitter 122A to the light source 110.

Based on the foregoing, because the beam splitter 122A of the measuring device 100A may be a polarized beam splitter and the measuring device 100A further includes the quarter-wave plate 150A and the quarter-wave plate 152A, the zero order diffraction light beams 212A and 222A generated after being diffracted by the optical grating 130 are not reflected to the light source 100, and the light source 110 of the measuring device 100A is not interfered by a reflective light beam on a light path system that causes an intensity change, so that the sensor 140 of the measuring device 100A measures a relatively good signal-noise ratio of an interference signal. In addition, the light beam 200 emitted by the light source 110 may be a linear polarized light beam, and thus a ratio of light intensities of the first light beam 210 and the second light beam 220 of the measuring device 100A may be adjusted by rotating the light source 110 by an angle along the z axis.

Figure 3:
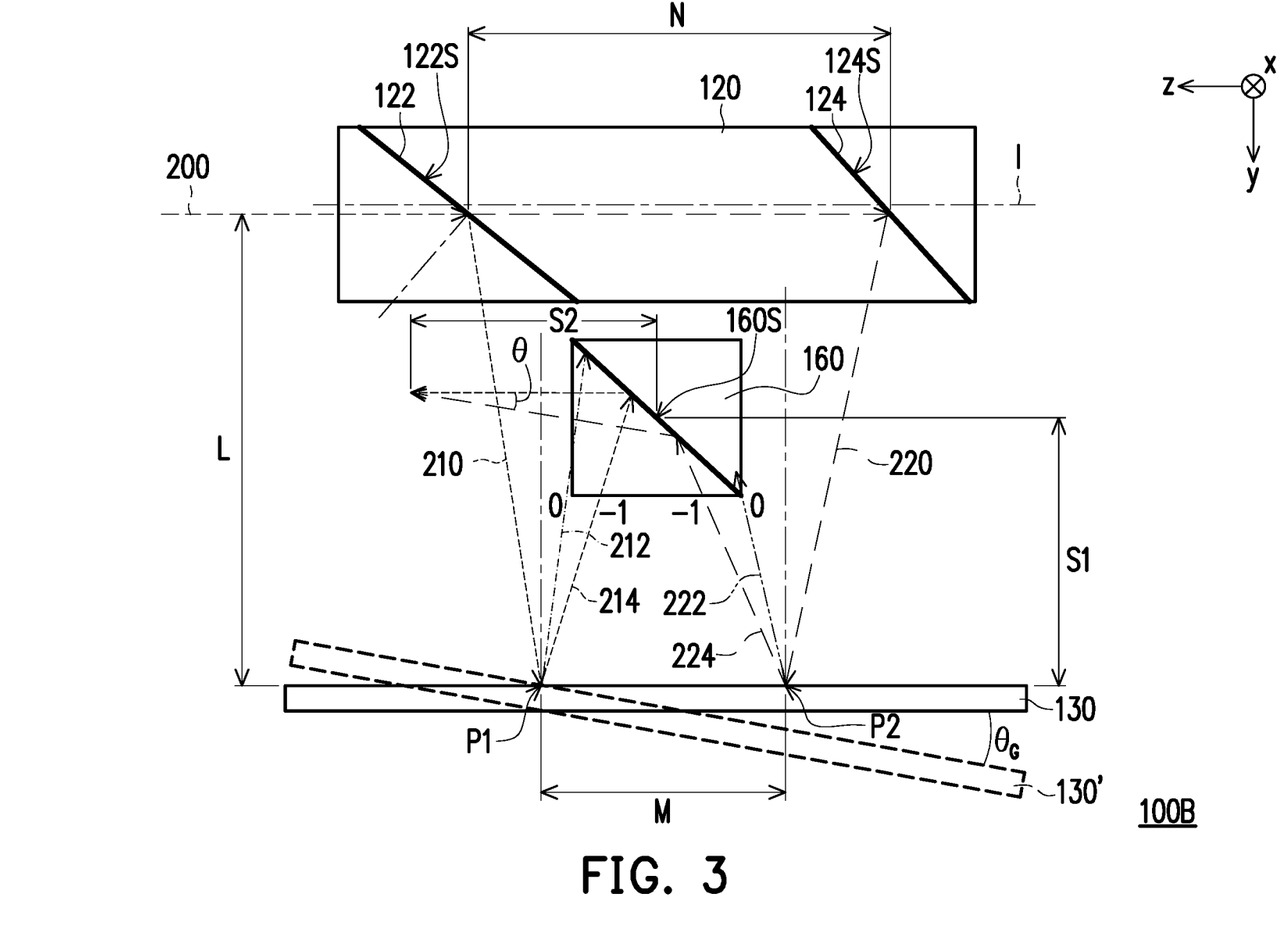
FIG. 3 is a schematic diagram of a measuring device according to another embodiment of the disclosure.

FIG. 3 is a schematic diagram of a measuring device according to another embodiment of the disclosure. Referring to FIG. 3, a measuring device 100B of FIG. 3 is similar to the measuring device 100 of FIG. 1A, and thus the descriptions of the same parts are omitted herein. Main differences between the measuring device 100B and the measuring device 100 are as below. A light source and a sensor are omitted to be shown in FIG. 3, and the measuring device 100B of FIG. 3 further includes a second beam splitter 160. The second beam splitter 160 is disposed on light paths of the first diffraction light beams 214 and the second diffraction light beams 224 received by the sensor after interference. The first diffraction light beams 214 and the second diffraction light beams 224 received by the sensor after interference are reflected by the second beam splitter 160 respectively and then incident onto the sensor.

In this embodiment, a beam splitting surface 122S of the first beam splitter 122 and a beam splitting surface 160S of the second beam splitter 160 are not parallel to each other, and the beam splitting surface 122S of the first beam splitter 122 and a reflective surface 124S of a reflector 124 are not parallel to each other. However, the disclosure is not limited thereof. The beam splitting surface 122S, the beam splitting surface 160S, and the reflective surface 124S may alternatively be parallel to each other or two of the above are parallel to each other. Specifically, there is an optical axis I between the first beam splitter 122 and the reflector 124 (or the lateral displacement beam splitter 120). An included angle between the beam splitting surface 122S and the optical axis I is not equal to 45 degrees, and an included angle between the reflective surface 124S and the optical axis I is not equal to 45 degrees. Therefore, the first light beam 210 and the second light beam 220 are not perpendicularly incident onto the optical grating 130, where an acute angle between the first light beam 210 and the optical grating 130 is greater than 0 degree and less than 90 degrees, and an acute angle between the second light beam 220 and the optical grating 130 is greater than 0 degree and less than 90 degrees.

Furthermore, in this embodiment, the optical grating 130 may rotate by an angle $\theta_G$ with respect to the optical axis I. Because the measuring device 100B of this embodiment further includes the second beam splitter 160 and the measuring device 100B may adjust angles between the beam splitting surface 122S of the first beam splitter 122, the beam splitting surface 160S of the second beam splitter 160, and the reflective surface 124S of the reflector 124, the measuring device 100B may adjust an incident angle of the light beam 200 of the light source, an angle of the beam splitting surface 122S, an angle of the reflective surface 124S, and an angle of the beam splitting surface 160S, to enable the diffraction light beams 214 and 224 to be overlapped at a needed position, and the measuring device 100B is more flexible to be used.

Figure 4A:
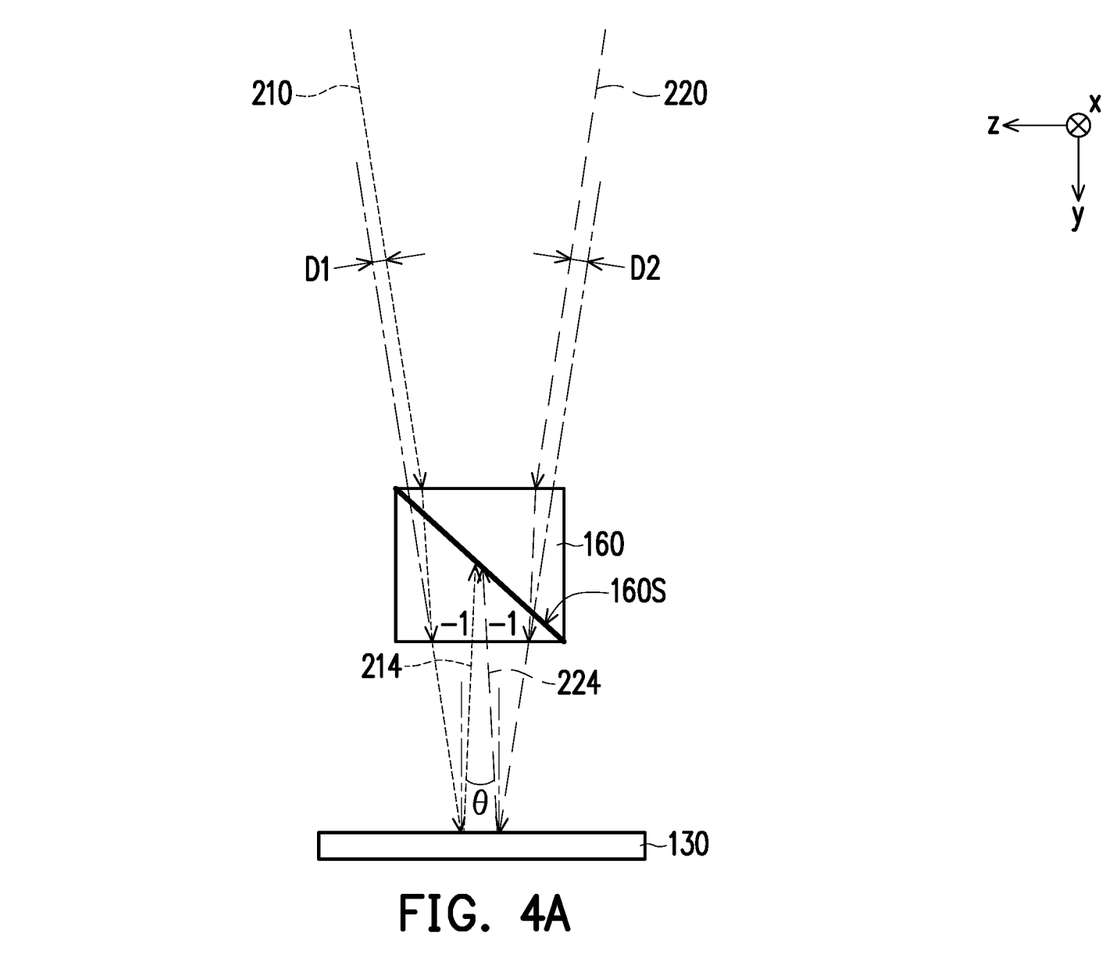
FIG. 4A is a schematic diagram of a measuring device according to another embodiment of the disclosure.

FIG. 4A is a schematic diagram of a measuring device according to another embodiment of the disclosure. Referring to FIG. 4A, main differences between FIG. 4A and FIG. 3 are as below. A first beam splitter and a reflector are omitted to be shown in FIG. 4A, and in FIG. 4A, a first light beam 210 and a second light beam 220 pass through a second beam splitter 160 respectively, and are then incident onto an optical grating 130. Furthermore, a refractive index of the second beam splitter 160 may be different from a refractive index of a surrounding medium. For example, a material of the second beam splitter 160 is glass, and the surrounding medium is air. Therefore, the first light beam 210 and the second light beam 220 respectively generate translation quantities D1 and D2 after passing through the second beam splitter 160. That is, the first light beam 210 being not incident onto the second beam splitter 160 and the first light beam 210 passing through the second beam splitter 160 are parallel to each other, but extension lines of the first light beam 210 being not incident onto the second beam splitter 160 and the first light beam 210 passing through the second beam splitter 160 are not overlapped. The second light beam 220 being not incident onto the second beam splitter 160 and the second light beam 220 passing through the second beam splitter 160 are parallel to each other, but extension lines of the second light beam 220 being not incident onto the second beam splitter 160 and the second light beam 220 passing through the second beam splitter 160 are not overlapped.

For example, the foregoing embodiment of FIG. 4A happens in a case where a size of the second beam splitter 160 is large, or in a case where a distance N between the beam splitting surface 122S of the first beam splitter 122 and the reflective surface 124S of the reflector 124 on the optical axis in FIG. 3 is shortened, or in a case where a size of the lateral displacement beam splitter 120 is small. A case where the first light beam 210 and the second light beam 220 pass through the second beam splitter 160 and are then incident onto the optical grating 130 may be selected for the measuring device of this embodiment of the disclosure. Therefore, the measuring device may be suitable for a large-sized second beam splitter 160, or a shortened distance N or small-sized lateral displacement beam splitter 120. The measuring device of this embodiment of the disclosure may be suitable for different optical components or different optical system settings.

Figure 4B:
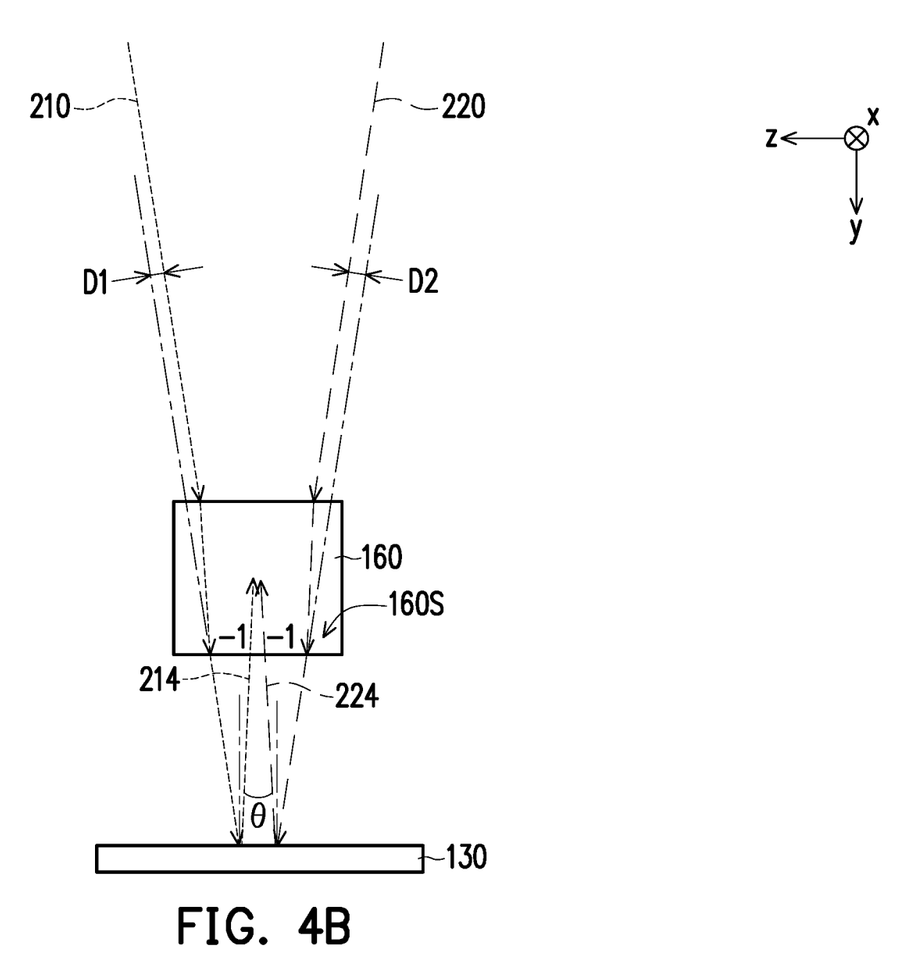
FIG. 4B is a schematic diagram illustrating that a second beam splitter of FIG. 4A rotates by 90 degrees clockwise along the y axis.

FIG. 4B is a schematic diagram illustrating that a second beam splitter of FIG. 4A rotates by 90 degrees clockwise along the y axis. Referring to FIG. 4B, main differences between FIG. 4B and FIG. 4A are as below. A second beam splitter 160 in FIG. 4B is obtained by rotating the second beam splitter 160 in FIG. 4A by an angle, for example, 90 degrees, clockwise along the y axis, to enable a beam splitting surface of the second beam splitter 160 in FIG. 4B to be transformed to be parallel to the z axis and inclined with respect to the x axis. That is, after the diffraction light beams 214 and 224 are incident onto the beam splitting surface of the second beam splitter 160, the light beams 214 and 224 are delivered in a direction approximately towards the x axis. However, the disclosure is not limited thereof, and an orientation of the beam splitting surface of the second beam splitter 160 may be freely adjusted according to a design need. Therefore, in the measuring device of this embodiment of the disclosure, the sensor may be disposed at a suitable position to coordinate a need on a light path, and the measuring device of this embodiment of the disclosure may further be disposed flexibly.

Figure 5:
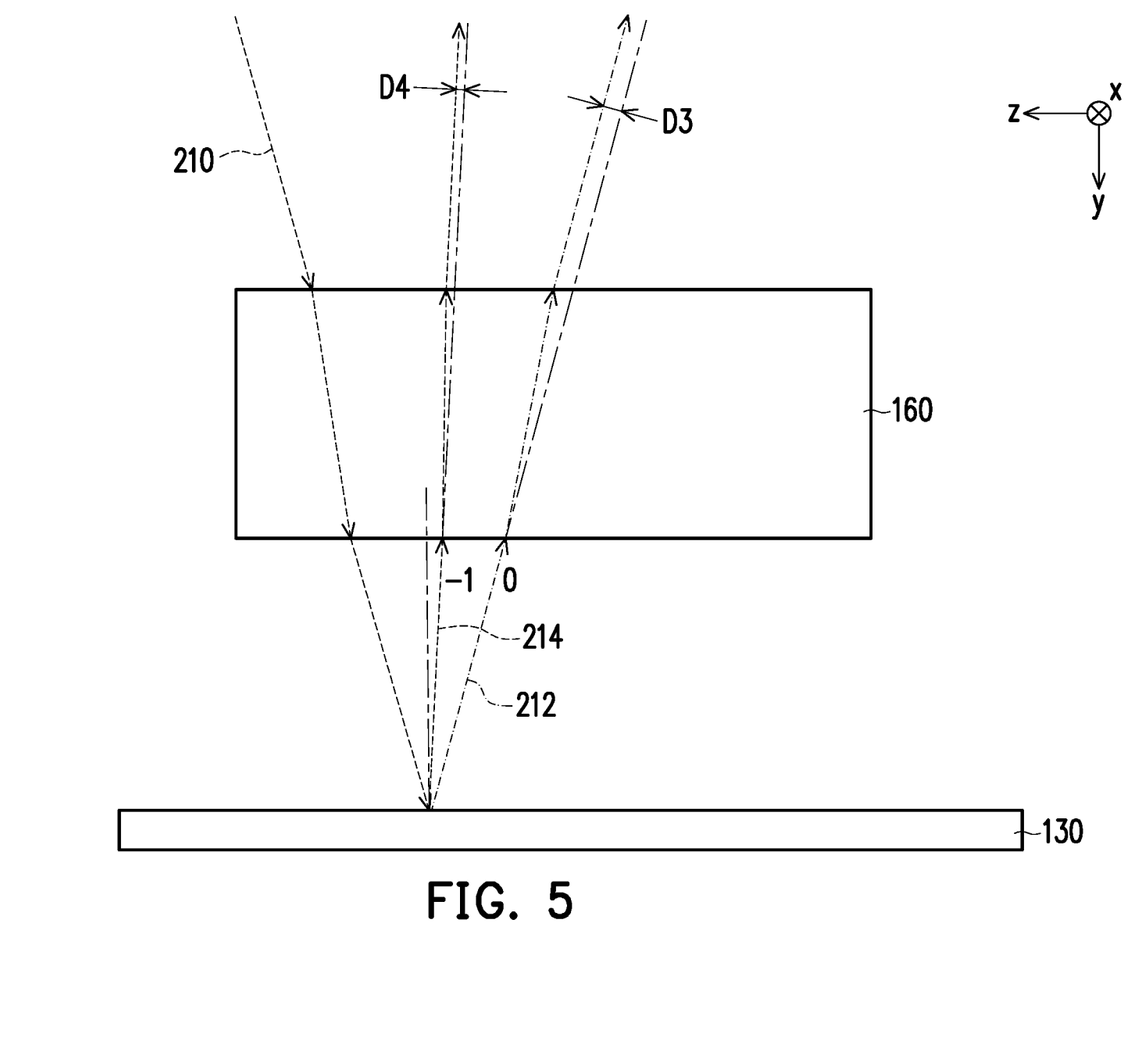
FIG. 5 is a diagram of partial enlargement of the second beam splitter of FIG. 4B.

FIG. 5 is a diagram of partial enlargement of the second beam splitter of FIG. 4B. Referring to FIG. 5, main differences between FIG. 5 and FIG. 4B are as below. A light path of a second light beam 220 is omitted to be shown in FIG. 5.

Figure 6:
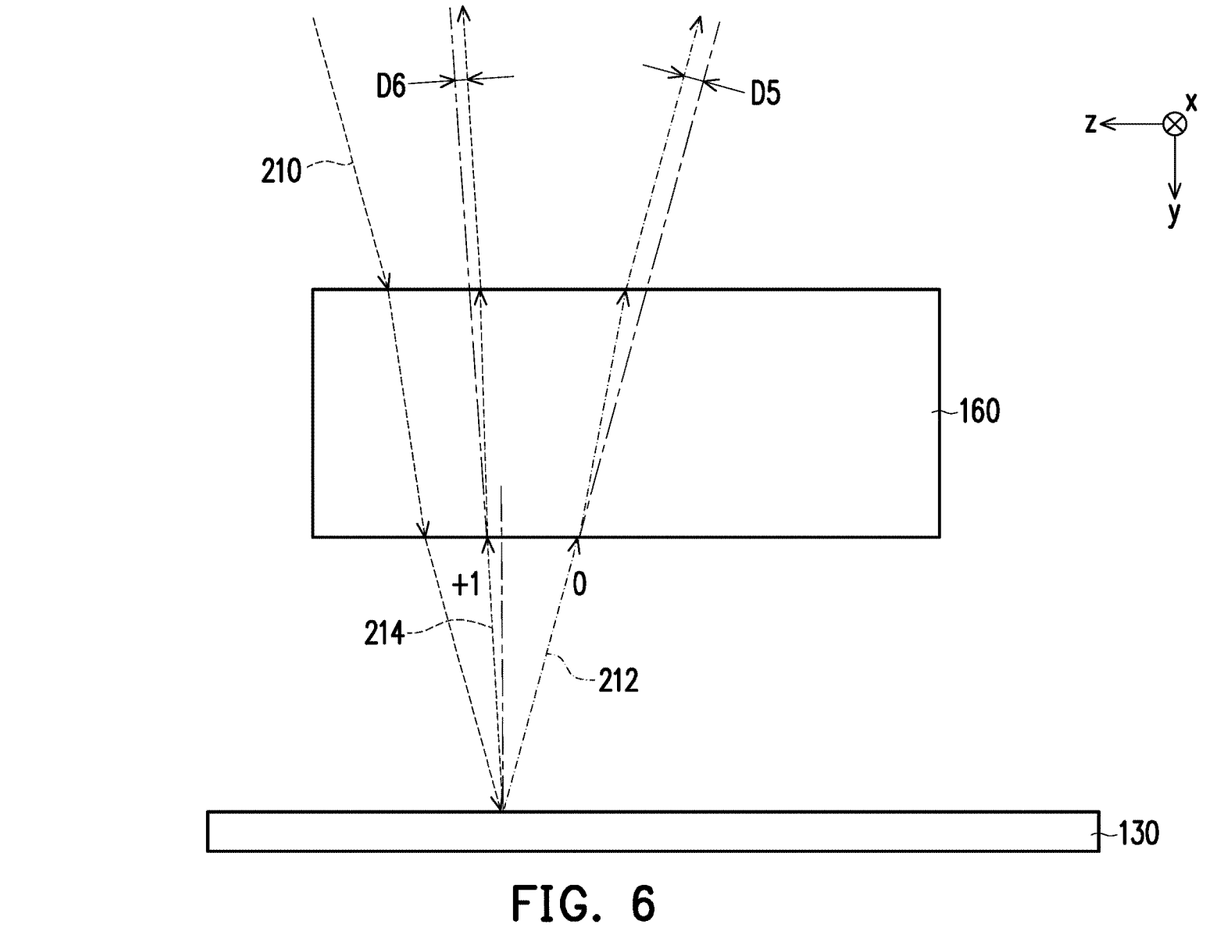
FIG. 6 is a schematic diagram of the measuring device using +1 order diffraction of FIG. 5.

FIG. 6 is a schematic diagram of the measuring device using +1 order diffraction of FIG. 5. Referring to FIG. 5 and FIG. 6, main differences between FIG. 5 and FIG. 6 are as below. FIG. 5 shows a case where the measuring device uses −1 order diffraction, and FIG. 6 shows a case where the measuring device uses +1 order diffraction. In FIG. 5, a zero order diffraction light beam 212 passes through the second beam splitter 160 and generates a translation quantity D3, and a −1 order diffraction light beam 214 passes through the second beam splitter 160 and generates a translation quantity D4. In FIG. 6, a zero order diffraction light beam 212 passes through the second beam splitter 160 and generates a translation quantity D5, and a +1 order diffraction light beam 214 passes through the second beam splitter 160 and generates a translation quantity D6. Because an included angle between the +1 order diffraction light beam 214 and the zero order diffraction light beam 212 in FIG. 6 is greater than an included angle between the −1 order diffraction light beam 214 and the zero order diffraction light beam 212 in FIG. 5, compared with the measuring device in FIG. 5, in the measuring device of FIG. 6, separation of the zero order diffraction light beam 212 and the +1 order diffraction light beam 214 is relatively easy in a light path design. On the contrary, in the measuring device of FIG. 5, separation of the zero order diffraction light beam 212 and the −1 order diffraction light beam 214 is relatively difficult in the light path design.

Besides, the diffraction light beam 214 of the measuring device in FIG. 6 uses a +1 order diffraction light beam, and the +1 order diffraction light beam 214 and an incident light beam 210 are at a left hand side with respect to a normal line of an optical grating 130, thus, another diffraction light beam omitted in FIG. 6 may use a +1 order diffraction light beam, and the +1 order diffraction light beam and an incident light beam thereof should be at a right hand side of the normal line of the optical grating 130. Therefore, in the measuring device of FIG. 6, after the first light beam 210 and a second light beam are incident onto the optical grating 130, to enable two respectively generated +1 order diffraction light beams to be overlapped in a space, the first light beam 210 and the second light beam may be firstly interleaved in the space before being incident onto the optical grating 130.

Figure 7:
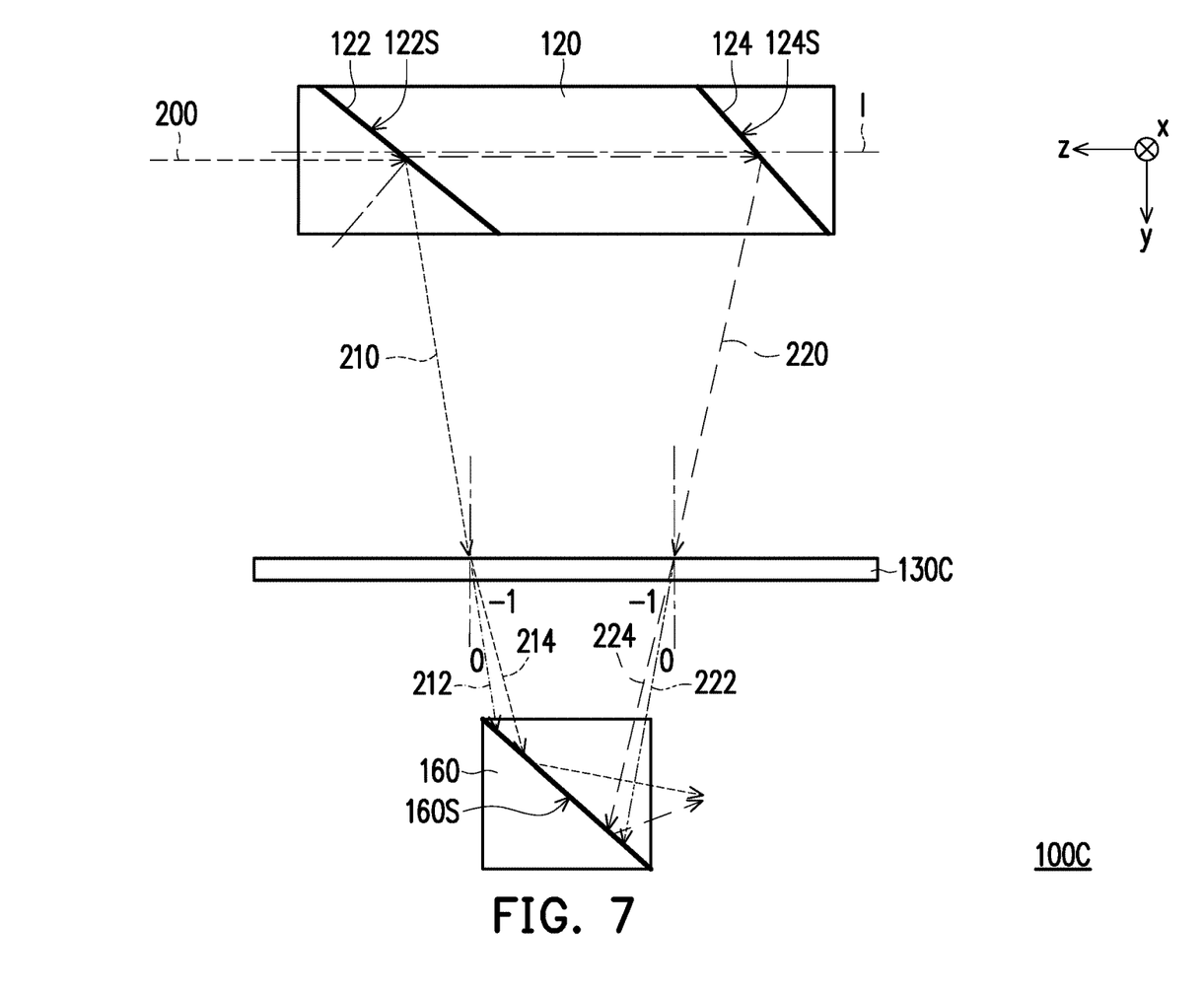
FIG. 7 is a schematic diagram of a measuring device according to another embodiment of the disclosure.

FIG. 7 is a schematic diagram of a measuring device according to another embodiment of the disclosure. Referring to FIG. 7, a measuring device 100C of FIG. 7 is similar to the measuring device 100B of FIG. 3, and thus the description of the same parts are omitted herein. Main differences are as below. In the measuring device 100C of FIG. 7, an optical grating 130C is a transmission optical grating. Compared with the measuring device 100b of FIG. 3, a light path design space of the measuring device 100C of FIG. 7 is larger.

Incidentally, the measuring device of this embodiment of the disclosure is not limited by a manner of component placement, a size of a component, and a manner of a light path design, or the like of the measuring devices from FIG. 1 to FIG. 7, and the measuring device of this embodiment of the disclosure may be designed according to the following manners.

Figure 8:
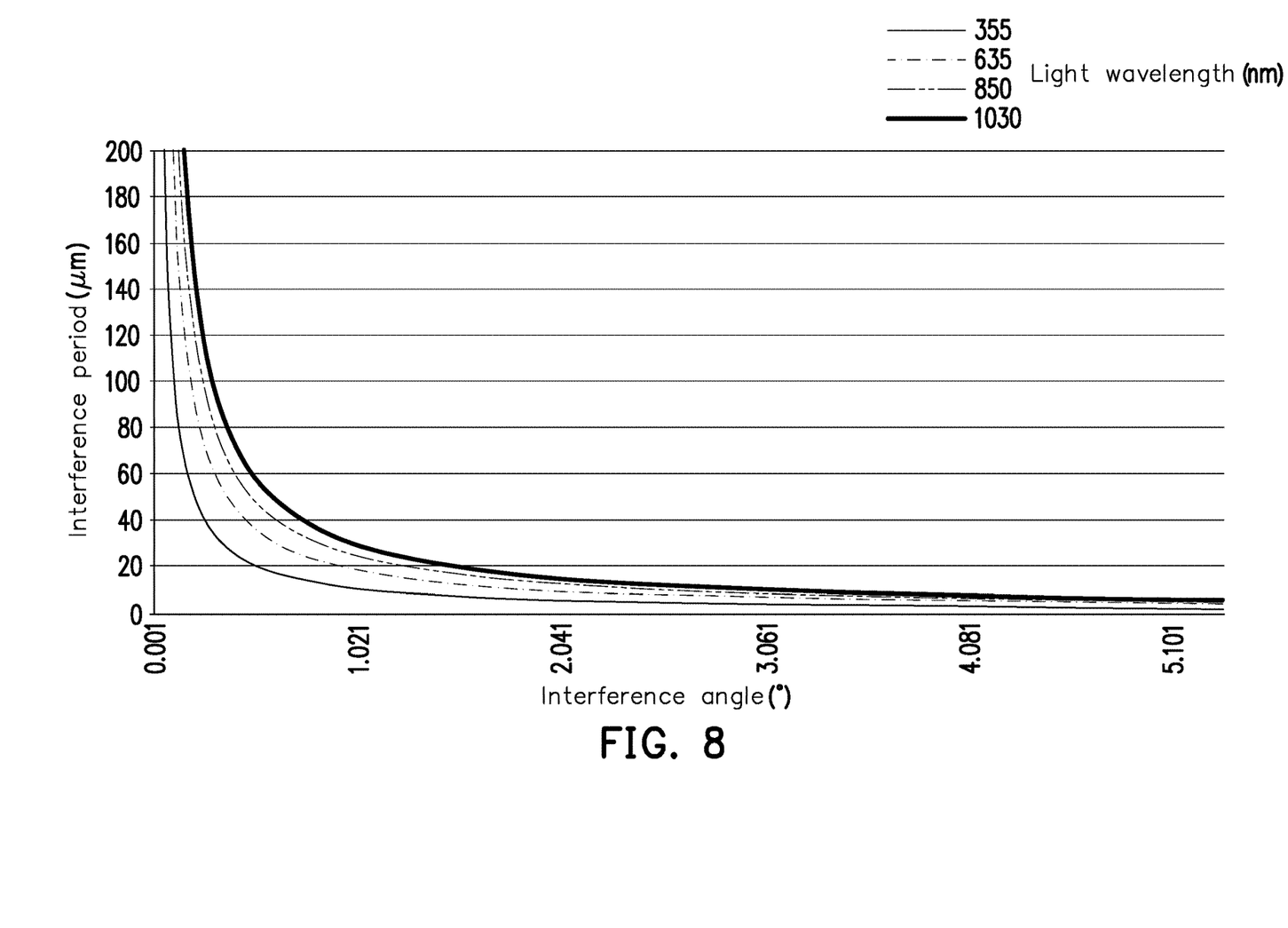
FIG. 8 is relationship diagram of interference periods with respect to interference angles under different wavelengths according to an embodiment of the disclosure.
Figure 9:
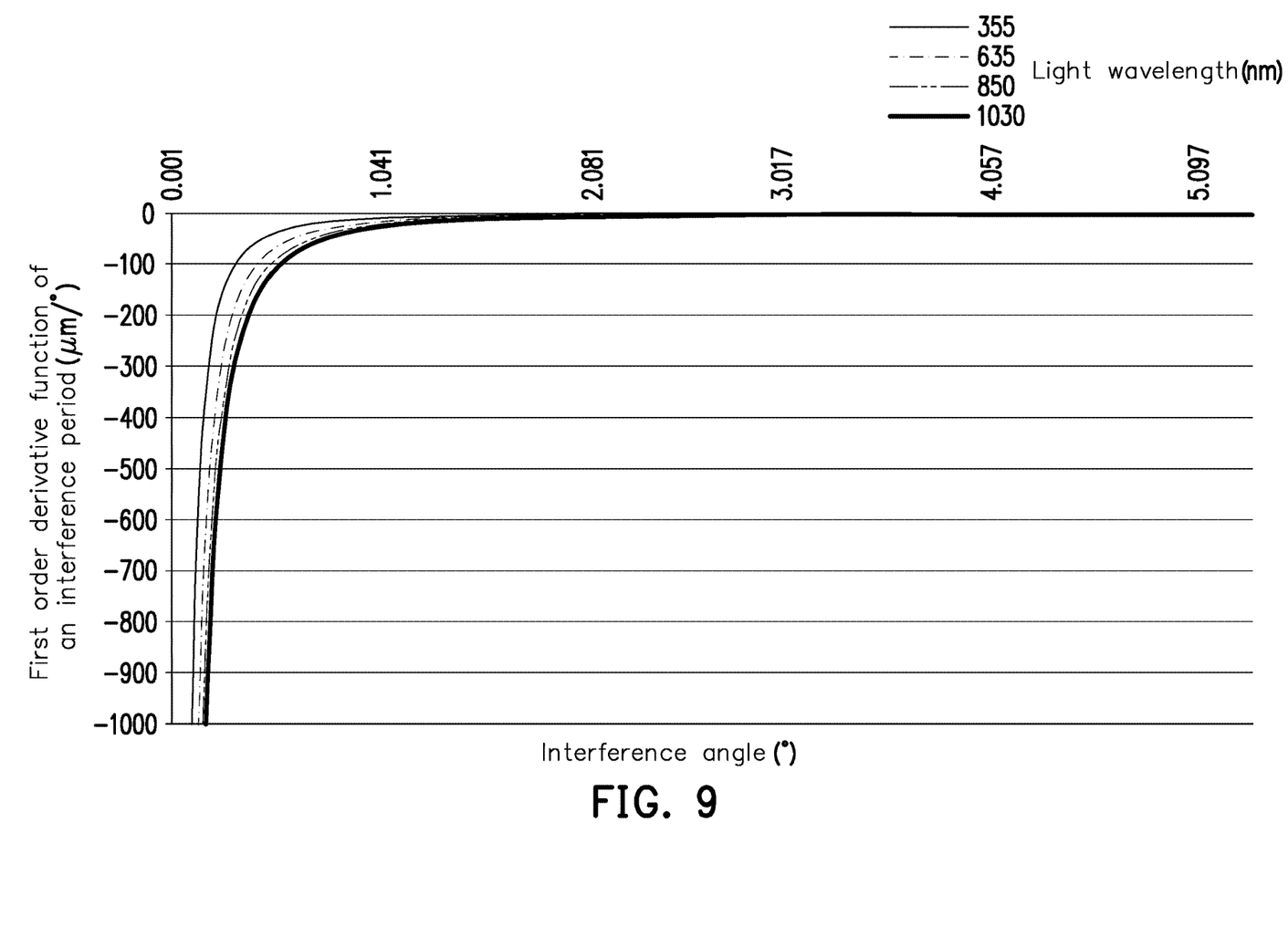
FIG. 9 is a curve chart of a first order derivative function of the interference periods with respect to the interference angles under the different wavelengths of FIG. 8.

FIG. 8 is relationship diagram of interference periods with respect to interference angles under different wavelengths according to embodiments of the disclosure. FIG. 9 is a curve chart of a first order derivative function of the interference periods with respect to the interference angles under the different wavelengths of FIG. 8. Referring to FIG. 3, FIG. 8, and FIG. 9, first, according to a measurement need, a wavelength 2 of a light beam 200, a diameter $L_D$ of a light spot, an interference period $P_s$ and an optical grating period $P_g$ of a light source 110 are given. The interference period $P_s$ is a period of an interference fringe generated after the diffraction light beams 214 and 224 are interfered, and the diameter $L_D$ of the light spot is a half-width of each interference fringe. Furthermore, according to the foregoing parameters, an interference angle $\theta_I$ of the diffraction light beams 214 and 224 may be decided, and a relational expression is $P_s=\lambda/2 \sin(\theta_t)$, where $\theta_I=\theta/2$. As shown in FIG. 8, for example, given that $\lambda=635$ nm (nanometer) and $P_s=200$ μm (micrometer), $\theta_I=0.09°$.

Subsequently, according to the relationship between the interference period $P_s$ and the interference angle $\theta_c$, angles at which the first light beam 210 and the second light beam 220 are incident onto the optical grating 130 may be decided. Furthermore, according to the incident angles of the first light beam 210 and the second light beam 220, an angle difference between a zero order diffraction light beam and ±1 order (or another order) diffraction light beams and the diameter $L_D$ of the light spot, a distance S between the optical grating 130 and the sensor 140 may be decided, so that the zero order diffraction light beam and the ±1 order (or another order) diffraction light beams can be separated on a light path. Using FIG. 3 as an example, the distance S is a sum of a distance S1 and a distance S2, where the distance S1 is a distance between the optical grating 130 and the second beam splitter 160, and the distance S2 is a distance between the second beam splitter 160 and the sensor 140.

Furthermore, based on the distance S and the interference angle θd, a distance M between positions P1 and P2 of the first light beam 210 and the second light beam 220 incident onto the optical grating 130 may be decided. Besides, based on the angles at which the first light beam 210 and the second light beam 220 are incident onto the optical grating 130, angles of the beam splitting surface 122S of the first beam splitter 122, the reflective surface 124S of the reflector 124, and the beam splitting surface 160S of the second beam splitter 160 (or included angles with the optical axis I) may be decided. Furthermore, based on the distance S and the distance M, a distance L and a distance N may be decided, where the distance L is a distance between the first beam splitter 122 and the optical grating 130, and the distance N is a distance between the first beam splitter 122 and the reflector 124.

Besides, because relationships among the foregoing parameters are associated with each other, a value of each parameter may also be set according to other cases in use by the measuring device of this embodiment of the disclosure. However, the value of each parameter may still be obtained by adjusting the foregoing steps. For example, the measuring device uses a lateral displacement beam splitter 120, and thus the distance N is decided by a size of the lateral displacement beam splitter 120. Or, space of the measuring device is limited, and thus, an adjustable range of the distance L is decided.

Based on the foregoing, by the measuring device in the embodiments of the disclosure, the first beam splitter is used to divide a light beam emitted by the light source into a first light beam and a second light beam and the sensor is enabled to receive interference spatial fringes between the diffraction light beams generated after the first light beam and the second light beam are diffracted by the optical grating, and thus the measuring device of the embodiments of the disclosure has a simple structure, and may adjust the interference angle and the interference period according to needs, and may be applied to collocations of different sensor periods and different optical grating periods.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A measuring device, comprising:
a light source, configured to emit a light beam;
a first beam splitter, disposed on a light path of the light beam, wherein the light beam is divided into a first light beam and a second light beam by the first beam splitter;
an optical grating, disposed on light paths of the first light beam and the second light beam, wherein the first beam splitter enables the first light beam to be delivered to the optical grating;
a reflector, disposed on the light path of the second light beam, wherein the first beam splitter enables the second light beam to be delivered to the reflector, and then the second light beam is reflected to the optical grating by the reflector; and
a sensor, wherein the first light beam and the second light beam are diffracted by the optical grating to generate a plurality of first diffraction light beams at different angles and a plurality of second diffraction light beams at different angles respectively, and the first diffraction light beams and the second diffraction light beams are received by the sensor after interference, wherein included angles between the first diffraction light beams and the second diffraction light beams incident onto the sensor after interference are greater than 0 degree and less than 180 degrees, and the sensor is enabled to receive spatial interference fringes between the first diffraction light beams and the second diffraction light beams.

2. The measuring device according to claim 1, wherein the first light beam is reflected by the first beam splitter to be delivered to the optical grating and the second light beam passes through the first beam splitter to be delivered to the reflector.

3. The measuring device according to claim 1, wherein the first light beam passes through the first beam splitter to be delivered to the optical grating and the second light beam is reflected by the first beam splitter to be delivered to the reflector.

4. The measuring device according to claim 1, wherein the first diffraction light beams and the second diffraction light beams received by the sensor after interference are +1 order diffraction light beams or −1 order diffraction light beams.

5. The measuring device according to claim 1, wherein the optical grating is a reflective optical grating.

6. The measuring device according to claim 1, wherein the first light beam and the second light beam are incident onto different positions of the optical grating respectively.

7. The measuring device according to claim 1, wherein the first light beam and the second light beam are perpendicularly incident onto the optical grating.

8. The measuring device according to claim 1, wherein the first beam splitter and the reflector are a lateral displacement beam splitter.

9. The measuring device according to claim 1, further comprising:

a first quarter-wave plate, disposed on the light path of the first light beam, wherein the first quarter-wave plate is located between the first beam splitter and the optical grating; and a second quarter-wave plate, disposed on the light path of the second light beam, wherein the second quarter-wave plate is located between the reflector and the optical grating.

10. The measuring device according to claim 9, wherein the first beam splitter is a polarized beam splitter.

11. The measuring device according to claim 1, further comprising:

a second beam splitter, disposed on light paths of the first diffraction light beams and the second diffraction light beams received by the sensor after interference, wherein the first diffraction light beams and the second diffraction light beams received by the sensor after interference are reflected by the second beam splitter to be incident onto the sensor respectively.

12. The measuring device according to claim 11, wherein a beam splitting surface of the first beam splitter and a beam splitting surface of the second beam splitter are not parallel to each other.

13. The measuring device according to claim 11, wherein after the first light beam and the second light beam pass through the second beam splitter respectively, the first light beam and the second light beam are then incident onto the optical grating respectively.

14. The measuring device according to claim 1, wherein the optical grating is a transmission optical grating.

* * * * *